Dec. 10, 1940.  C. C. ABBOTT  2,224,585

HANDLE STRUCTURE

Original Filed July 30, 1936

Inventor:
Charles C. Abbott,
by Harry E. Dunham
His Attorney.

Patented Dec. 10, 1940

2,224,585

UNITED STATES PATENT OFFICE 2,224,585

HANDLE STRUCTURE

Charles C. Abbott, Pittsfield, Mass., assignor to General Electric Company, a corporation of New York Original application July 30, 1936, Serial No. 93,411. Divided and this application July 26, 1939, Serial No. 286,541

5 Claims. (Cl. 174—46)

This invention relates to handle structures, more particularly to handle structures for electrically heated tools, such as electric soldering irons, and it has for its object the provision of an improved device of this character.

This invention contemplates the provision of an improved organization of parts in a handle structure for electrically heated tools, and particularly a handle structure having improved electrical connections for the heating element of the tool.

This application is a division of my copending application, Serial No. 93,411, filed July 30, 1936.

Figure 1:
Figure 2:
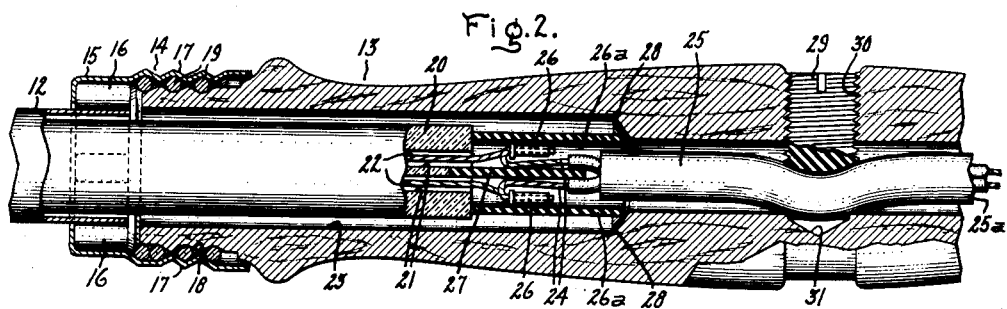
Figure 3:
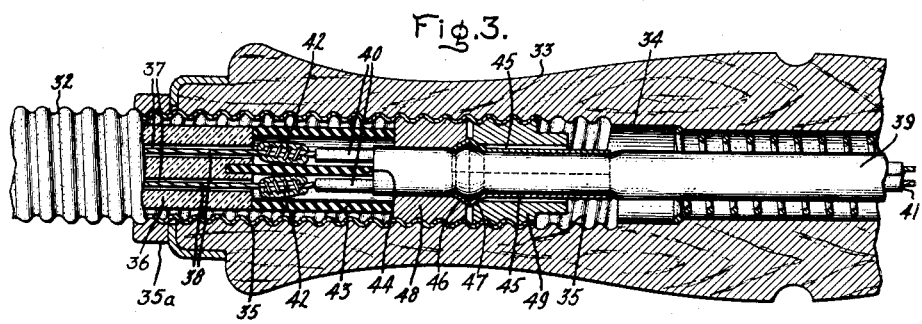
Figure 4:
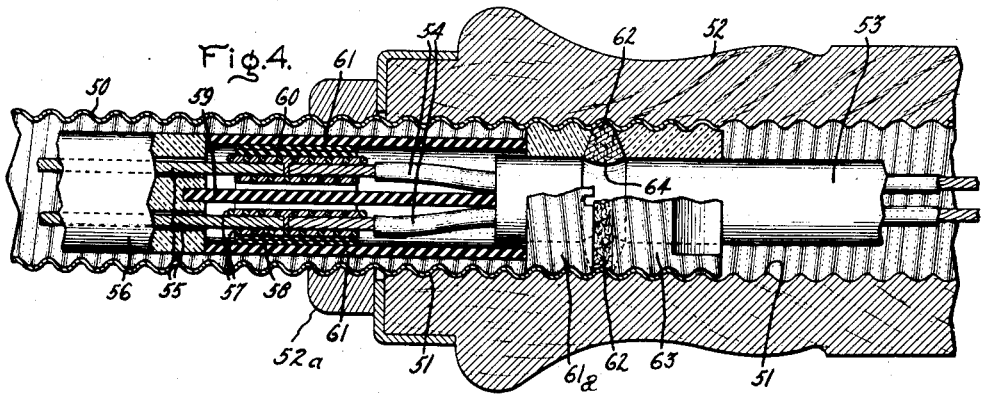

For a more complete understanding of this invention, reference should be had to the accompanying drawing in which Fig. 1 is an elevation illustrating an electrically heated soldering iron provided with a handle structure embodying this invention; Fig. 2 is an enlarged fragmentary elevation mainly in section illustrating a handle structure used in the soldering iron of Fig. 1, and showing improved electrical connections for the heating element of the soldering iron arranged in accordance with this invention; Fig. 3 is a view similar to Fig. 2, but illustrating a handle structure of modified form arranged in accordance with this invention; and Fig. 4 is an enlarged sectional view of still another form of handle structure embodying this invention.

Referring to the drawing, this invention has been shown in one form as applied to a soldering iron having a working tip 10, a heating element 11 for applying heat to the tip 10, a metallic support 12 for the heating element and tip, and a handle 13 secured to the metallic support, whereby the iron may be manipulated.

As shown, the heating element 11 is of cylindrical form, and may be of any suitable construction. Preferably, however, it will be heated by a sheathed heater, such as described and claimed in my United States Patent No. 1,698,289, dated January 8, 1929.

As shown, the supporting member 12 is of straight tubular form and is connected to the handle 13 by a handle ferrule 14. This ferrule 14, as shown, has a portion 15 surrounding the tube 12 in spaced relation with it and within this space there are provided a plurality of pins 16 spaced circumferentially of the tube 12. These pins have diameters such that they space the ferrule in substantially concentric relation with the tube 12, and so as to have line contact with the tube and ferrule. The pins 16 are rigidly secured to the tube and ferrule in any suitable manner, as by copper brazing.

The ferrule 14 is provided with a threaded section 17 which is positioned opposite a threaded section 18 provided on the handle. Lying within the threads on the handle and ferrule is a coiled member 19 formed of circular stock. This member, it will be observed, contacts the ferrule and handle with line contacts only.

It will be observed in view of the foregoing arrangement that the ferrule 14 is spaced a material distance from the metallic support 12 by the pins 16 and has very poor thermal contact with the support. Also it will be observed that the ferrule is supported in spaced relation and has but line contact with the handle. The handle is, therefore, thermally insulated from the tube 12, and consequently, from the heating element and tip organization. The foregoing thermal insulating means is described and claimed in my copending application Serial No. 197,353, filed March 22, 1938.

An insulating core 20 formed of a suitable electrically insulating material, such as porcelain, extends through the tube 12. The core 20 is provided with a pair of passageways 21 through which a pair of leads 22 for the heating element 11 are directed. These leads, as shown, project from the end of the insulator 20 into a bore 23 provided in the handle 13. The insulator also projects into the bore for some distance, as shown. The leads 22 are secured to the conductors 24 of a twin supply conductor or lead 25 by means of suitable eyelets 26. This conductor has an insulating covering 25a formed of a suitable yielding material, such as rubber. The end portions of the bare conductors and the leads will preferably be arranged side by side, as shown, and then twisted together, and then the eyelets will be slipped over the twisted portions and compressed or swaged into tight engagement with the conductors. Then the eyelets will be folded over, as shown. Surrounding the connected portions of the leads and conductors is an insulating sleeve 26a, and interposed between them is an insulating wall or barrier 27. The outer end of the sleeve 26 rests against a shoulder 28 provided in the handle, as shown, and the inner ends of the sleeve and barrier 27 abut against the core 20. Preferably the inner end of the barrier is fitted into a recess in the core, as shown. The outer end of the barrier 27 fits in snugly between the conductors 29 just short of the covering 25a, as shown. The sleeve 26a and the barrier 27 will be formed of any suitable insulating material, such as an insulating fiber.

The twin supply conductor 25 is secured by means of a plug or set screw 29 threaded in a bore 30 provided for it in the handle and arranged transversely of the bore 23. Opposite the bore 30 is an angular depression 31 into which the covering for the two conductors is forced by the plug 29 when screwed inwardly sufficiently, as shown. This locks the lead against withdrawal from the handle, and also prevents twisting of the cord relative to the handle.

In the form of this invention shown in Fig. 3, the metallic support 32 for the heated element is threaded from end to end. This member at its end opposite the heated element receives the handle 33 in threaded engagement with it. The handle 33 is provided with a centrally arranged bore 34 having a threaded section 35 to receive the metallic support 32. The position of the handle may be adjusted by turning it on the support and it is held in its adjusted position by means of a lock nut 35a.

Extending longitudinally through the metallic member 32 is an insulating member 36 provided with a pair of spaced-apart passageways 37 through which a pair of leads 38 connected to the terminals of the heating element are directed. The member 36 is formed of any suitable insulating material, such as porcelain. The leads 38, as shown, project from the end of the insulator 36 into the tube 32.

Entering the bore 34 of the handle is a suitable electrical supply lead 39 comprising a pair of supply conductors 40 which are insulated and which are covered by a common insulating coating 41 formed of any suitable electrically insulating yielding material, such as rubber. The ends of the conductors 40 are bared, as shown, and are arranged in overlapping relation with the associated ends of the leads. The overlapped ends of the leads and conductors are secured together by means of conducting wires 42 tightly wound about the ends, as shown, and soldered after being wound.

An insulating sleeve 43 is inserted in the tubular member 32 about the portions of leads and conductors connected together, and these portions are separated by an insulating wall 44. These members 43 and 44 preferably will be formed of a suitable insulating fiber.

The lead 39 is secured in the handle 33 against withdrawal by means of a pair of curved clamping members 45 positioned within the support 32 on opposite sides of the insulating coating 41, as shown. These members 45 are provided with oppositely inclined surfaces 46 and 47. These inclined surfaces are arranged between a pair of clamping nuts 48 and 49 positioned on opposite sides of the surfaces and having threading engagement with the tubular support 32. The nuts as shown have wedging or inclined faces engaging the inclined faces 48 and 49 of the clamps, and the nuts are turned inwardly toward each other sufficiently to force the clamping members 45 tightly against the insulated covering 41. Preferably, the inner nut 48 will be fitted tightly against the insulating sleeve 43 to hold it in place, and will be rigidly secured to the support in any suitable manner, as by brazing. It may be secured by indenting the support into the nut. As shown, the inner end of the sleeve 43 abuts against the core 36, while the inner end of the barrier 44 fits into a recess provided for it in the core. The other end of the barrier abuts against the conductor covering 41.

It will be understood that the threaded connection between the handle 33 and the support 32 provides means whereby the position of the handle can be adjusted relative to the heating unit.

In the form shown in Fig. 4, the support 50 is similar to the support 32, and is inserted in a bore 51 provided for it in the handle 52, the bore being threaded to receive the threaded support, whereby the position of the handle with reference to the heating element (not shown) may be adjusted. A lock nut 52a holds the handle in its adjusted position. An insulated twin-supply conductor 53 is directed into the bore 51 and its conductors 54 are connected to the leads 55 provided for the heating element. The leads, as shown, are threaded through an insulating core 56 in the tubular support 50, and are electrically connected to the conductors 54 by means of coiled connector members 57 wrapped tightly around the abutting ends of the leads and conductors. Preferably, the coiled connectors will be soldered to the conductors and leads, the soldering material 58 filling the spaces between the ends of the conductors and leads, and those between the turns of the connectors as clearly shown in Fig. 4. The leads and connectors where joined are separated by an insulating barrier 59 and the joints are surrounded by suitable tapes 60, formed of insulating material. The whole is surrounded by an insulating tube 61 positioned in the tube 50 between the core 56 and a metallic nut 61a threaded on the support, as shown. The nut 61a is secured to the tube 50 by brazing or by indenting the tube into the nut. The barrier 59 has its inner end fitted in a recess in the core 56 and its outer end abutting the covering of the conductor 53, as shown.

Against the outer side of the nut 61a is an annular flexible washer 62 formed of any suitable yielding material, such as rubber. On the outer side of the annular member is a plug 63 also having a threaded connection with the tube 50. The plug 63 is turned inwardly sufficiently to tightly compress the annular member 62 so that it is forced into the insulated covering for the twin-supply conductor, as indicated by the numeral 64. The adjacent ends of the plugs 61a and 63 will be tapered, as shown, so that when the plug 63 is turned inwardly, the tapered edges will engage the yieldable member 62 to force the material of the member inwardly into the insulated covering of the conductor 53. This arrangement rigidly secures the conductor 53 in the handle.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A handle structure for electrically heated tools and the like comprising a handle having a bore therein, electrical supply leads having ends inserted in one end of said bore and a supply conductor having conducting elements for said leads inserted in the other end of said bore, an insulator in said one end having passageways through which said leads pass respectively into said bore, means within said bore connecting said conducting elements with said leads, an electrically insulating sleeve within said bore surrounding said connecting means and the adjacent sections of said leads and conducting elements, and an insulating barrier between said sections and connecting means, the inner ends of said sleeve and barrier engaging said insulator, and means holding the outer ends of said sleeve and barrier.

2. A handle structure for electrically heated soldering irons and the like comprising a handle having a bore therein, electric supply conductors entering said bore having an insulating covering, a plurality of clamping members within said bore having elongated curved clamping sections fitted to said insulating covering and having oppositely inclined portions, and a pair of wedge members within said bore acting on said inclined portions so as to force said elongated clamping sections into engagement with said insulating covering.

3. A handle structure for electrically heated tools and the like having electric supply leads a handle having a bore therein, an insulator in one end of said bore through which said leads pass into said bore, electric supply conductors entering the other end of said bore having an insulating covering, means securing said conductors to said leads respectively, an insulating sleeve in said bore around said latter means, an insulating wall within said sleeve between said connected supply conductors and leads respectively, and said insulator having a recess into which the adjacent end of said insulating wall is fitted.

4. A handle structure for an electrically heated tool and the like comprising a handle having a bore therein, an insulator in one end of said bore through which supply leads are directed, electrical supply conductors having an insulating covering directed into the other end of said bore, the ends of said conductors being assembled together with the ends of said leads respectively and eyelets in said bore compressed on the ends of each pair of assembled conductor and lead respectively, the joined ends of said members and eyelets being folded over said conductors, an insulating barrier in said bore between the connected conductors and leads, and an insulating sleeve in said bore surrounding said eyelets and the portions of said conductors and leads secured together by the eyelets.

5. A handle structure for an electrically heated tool and the like comprising a tubular support, a handle having a bore therein receiving the end of said tubular support, an insulator mounted in said tubular support, a pair of electric supply leads threaded through said insulator and into said bore, a pair of electric supply conductors entering said bore having an insulating covering, means securing said conductors to said leads respectively, an insulating sleeve in said support around said latter means, a yieldable annular member in said support around said supply conductors, a clamping member in said support on one side of said annular member between the annular member and said sleeve and bearing on the sleeve, and a second clamping member in said support on the other side of said annular member, said clamping members having threaded connections with said support and threaded towards each other to compress said annular member between them sufficiently to force it tightly against said support and into said insulating covering.

CHARLES C. ABBOTT.